(12) United States Patent
Ebenezer et al.

(10) Patent No.: US 6,248,871 B1
(45) Date of Patent: Jun. 19, 2001

(54) REACTIVE DYES CONTAINING PIPERAZINE

(75) Inventors: Warren James Ebenezer, Stockport; Donna Maria Mynett, Newcastle-u-Lyme, both of (GB)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/462,500

(22) PCT Filed: Jul. 20, 1998

(86) PCT No.: PCT/GB98/02162

§ 371 Date: Jan. 24, 2000

§ 102(e) Date: Jan. 24, 2000

(87) PCT Pub. No.: WO99/05224

PCT Pub. Date: Feb. 4, 1999

(30) Foreign Application Priority Data

Jul. 25, 1997 (GB) .................................................. 9715830

(51) Int. Cl.[7] .............................. C09B 62/09; D06P 1/382
(52) U.S. Cl. ............................................................. 534/634
(58) Field of Search ............................................. 534/634

(56) References Cited

FOREIGN PATENT DOCUMENTS

| 126265 | * 11/1984 | (EP) . |
| 395951 | * 11/1990 | (EP) . |
| 458743 | * 11/1991 | (EP) . |
| 1283771 | * 8/1972 | (GB) . |

* cited by examiner

Primary Examiner—Fiona T. Powers
(74) Attorney, Agent, or Firm—Oblon, Spivak, McClelland, Maier & Neustadt, P.C.

(57) ABSTRACT

Reactive dyes containing piperazine have formula (I)

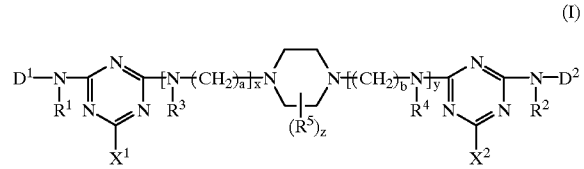

(I)

wherein: each of $D^1$ and $D^2$, independently, is a chromophoric group; each of $R^1$, $R^2$, $R^3$ and $R^4$, independently, is H or an optionally substituted alkyl group; each of $X^1$ and $X^2$, independently, is a labile atom or group; each of x and y, independently is 0 or 1 and at least one of x and y is 1; each of a and b independently, is 1 to 5; the or each $R^5$, independently, is alkyl; and z is 0 to 4. For colouration of a substrate the dyes can be applied at a pH above 7 by, for example, exhaust dyeing, padding or printing.

56 Claims, No Drawings

REACTIVE DYES CONTAINING PIPERAZINE

This invention relates to reactive azo dyes containing piperazine.

EP-A-0126265 discloses a range of reactive azo dyes of the formula (A).

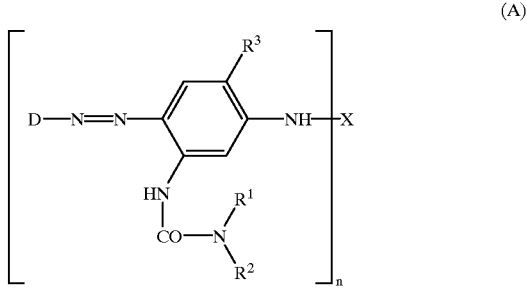

wherein

D is a residue of a benzene- or naphthalenesulphonic acid which is optionally further substituted;

$R^1$ is hydrogen, $C_{1-10}$-alkyl, cycloalkyl, benzyl or a group $C_2H_4OR^4$, $C_2H_4$—$OC_2H_4OR^4$, $C_3H_6OR^4$ or $CH(CH_3)CH_2OR^4$ (in which $R^4$ is $C_{1-4}$alkyl);

$R^2$ is a group $R^1$ or is an optionally substituted sulpho-free, phenyl group;

$R^3$ is hydrogen, methyl, methoxy, chloro or sulfo and n is 1 or 2. When n=1, X is at least one reactive group and when n=2, X is a group of the formula

in which each of $X^1$ and $X^2$ is a reactive group such as a triazine and B is a linking bridge derived from an amine. In one example (Compound 192), the linking bridge is derived from 2-aminoethylpiperazine. Compound 192 has the formula (20)

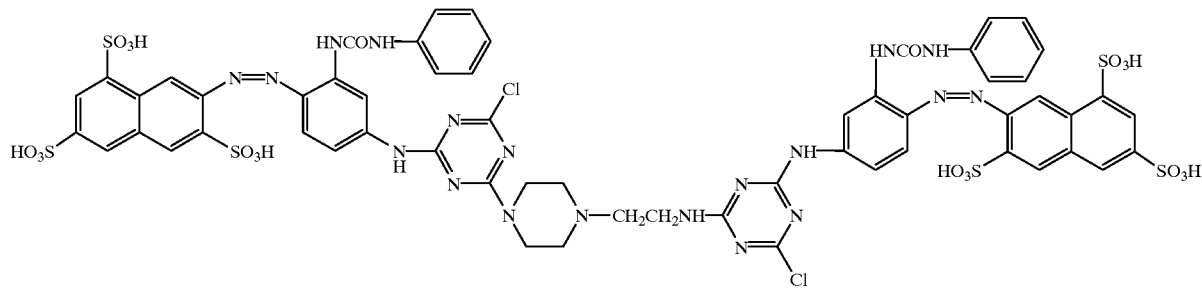

It is to be noted especially that the disclosure of EP-A-0126265 explicitly excludes components wherein each of $R^1$ and $R^2$ is hydrogen at the same time.

GB-A-1283771 discloses a range of reactive disazo dyes of the formula (B)

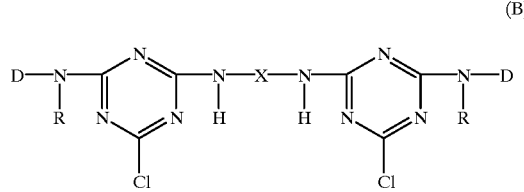

where D is a naphthylazo-phenylene or -naphthalene containing at least 3 sulphonic acid groups, R is H or an optionally substituted $C_{1-4}$ alkyl group and X is specifically a phenylene, diphenylene or naphthalene nucleus. They offer a degree of fixation over a wide range of liquor to goods ratios and provide shades of very good light fastness.

We have found surprisingly that if in dyes generally of this type, the group X is an asymmetrical amino piperazine derivative thereof as defined below, such dyes, especially when used for exhaust dyeing of cellulosic materials, can exhibit excellent properties, including build-up, aqueous solubility, light-fastness, wash-off and robustness to process variables.

According to one aspect, the present invention provides a dye of the formula (I)

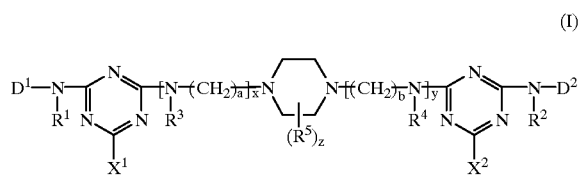

wherein:

each of $R^1$, $R^2$, $R^3$ and $R^4$, independently, is H or an optionally substituted alkyl group;

each of $X^1$ and $X^2$, independently, is a labile atom or group;

each of x and y, independently, is 0 or 1 and at least one of x and y is 1;

each of a and b, independently, is 2 to 5;

when each of x and y is 1, a>b;

the or each $R^5$, independently, is alkyl;

z is zero or is 1 to 4; and each of $D^1$ and $D^2$, independently, is a monoazo or polyazo chromophore, or a metallized derivative thereof, provided that the dye of the formula I is other than a dye of the formula (20), given above.

In one preferred range of dyes embodying the invention, each of x and y is 1, in which case, more preferably, each of a and b, independently, is 2 or 3.

In an alternatively, even more preferred embodiment, x is 0 and y is 1, in which case, more preferably, b is 2 or 3.

The piperazine nucleus is preferably unsubstituted (z=zero) or substituted in one or both of the 2- and 5-positions, more preferably with methyl or ethyl.

Preferred values of $X^1$ and $X^2$ are halogen, especially fluorine and chlorine, and a pyridinium salt, most typically a 3- or 4- carboxy pyridinium salt derived respectively from nicotinic and isonicotinic acid.

Each group $R^1$–$R^4$, independently, is preferably H or $C_{1-4}$ alkyl, for example, methyl, ethyl or propyl, which $C_{1-4}$ alkyl group is optionally substituted, for example, by a hydroxy group.

Preferred chromophoric groups $D^1$ and $D^2$ are monoazo, disazo and other polyazo dyes, which, more preferably contain at least one sulphonic acid group. Especially preferred dyes contain at least one monoazo or at least one disazo chromophoric group $D^1$ or $D^2$. The groups $D^1$ and $D^2$, even if each is a monoazo or each a disazo chromophore, may be the same as, or different from, one another. The use of different respective chromophores $D^1$ and $D^2$ allows the synthesis of a range of new yellows, reds and navies and, for example, when chromophore $D^1$ would provide a yellow dye and $D^2$ a blue dye, a new homogenous green dye may be obtained.

In a preferred range of monoazo dyes, each of $D^1$ and $D^2$, independently, is an optionally metallized monoazo chromophore of the formula (i)

(i)

wherein:
one of A and E is attached to the reactive triazinylamino group;
A is derived from a diazotizable amine; and
E is derived from a coupling component.

In a preferred range of dyes of the formula (i), A is an optionally substituted aryl group and when A is attached to the triazinylamino group, the attachment may be from the aryl group or from a substituent thereon;

E is an optionally substituted aryl or heteroaryl group and when E is attached to the triazinylamino group the attachment may be from the aryl or heteroaryl group or from a substituent thereon, or E is an acetoacetamidoaryl group wherein the aryl moiety is optionally substituted and wherein the azo linkage in the formula (i), given and defined above, is linked to the methylene group of the acetoacetamidoaryl group and when E is attached to the triazinylamino group the attachment may be from the aryl moiety or from a substituent thereon.

In one, more preferred, range of dyes of formula (i) in which the group A is attached to the triazinylamino group in formula (I), given and defined above,
A is a phenyl or naphthyl group;
which said phenyl or naphthyl group is optionally substituted by an alkyl (preferably $C_{1-4}$ alkyl), phenyl, naphthyl or amino- (which may bear a $C_{1-4}$ alkyl group), amido- or sulphonamido-phenyl or naphthyl group and A may be attached to the triazinylamino ring from the said substituent alkyl, phenyl or naphthyl group or phenyl or naphthyl moiety of the said substituent;
which said phenyl or naphthyl group of A is additionally optionally substituted by an alkyl (preferably $C_{1-4}$alkyl), alkoxy, (preferably $C_{1-4}$alkoxy) or halo (preferably chloro) group or a carboxylic acid or sulphonic acid group or a salt thereof; and E is an aryl or heteroaryl group selected from phenyl, naphthyl, pyrazolyl, pyrazolonyl, pyridyl, pyridonyl and pyrimidinyl groups or is an acetoacetamidoaryl group;
which said aryl or heteroaryl group is optionally substituted at least so as to provide the coupling component from which the group E is derived with sufficient electron donating capacity to allow the said coupling (in general, when E is a pyridyl or pyrimidinyl group, the presence of at least one electron donating group is necessary to allow coupling); and
which said aryl moiety of the acetoacetamidoaryl group is optionally substituted preferably by at least one of alkyl, alkoxy, halo, $H_2NCONH$, $CH_3CONH$ or $SO_3H$ (or a salt thereof), more preferred alkyl and alkoxy being $C_{1-4}$alkyl and $C_{1-4}$ alkoxy.

In the above dyes, especially when E is an a-naphthol group, the dye is optionally metallized.

When the group E is a phenyl or naphthyl group, still more preferably this is optionally substituted by an alkyl (preferably $C_{1-4}$alkyl), alkoxy (preferably $C_{1-4}$alkoxy), ureido, acylamino (preferably $C_{2-5}$acylamino), alkyl (preferably $C_{1-4}$alkyl) sulphonyl, halo (preferably chloro), hydroxyl or amino group, which amino group is optionally substituted by at least one (preferably $C_{1-4}$) alkyl group, or is a carboxylic or sulphonic and group or a salt thereof.

When the group E is a pyrazolyl, pyrazolonyl, pyridyl, pyridonyl or pyrimidinyl group, still more preferably this is substituted by a hydroxyl, mercapto or amino group, which amino group is optionally substituted by at least one (preferably Coo) alkyl group.

In one especially preferred range of such dyes, E is an acetoacetamidoaryl group and A is an optionally substituted phenylene group such that at least one of $D^1$- and $D^2$- is a chromophore of the formula (iv)

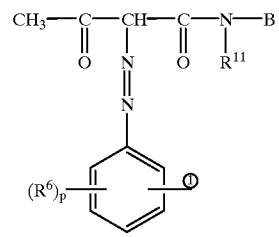

(iv)

wherein:
B is an optionally substituted aryl group;
the or each $R^6$, independently, is alkyl, alkoxy, halo, $H_2NCONH$, $CH_3CONH$ or $SO_3H$ (or a salt thereof);
$R^{11}$ is hydrogen or alkyl;
p is zero or 1-4, more preferably zero or 1-3, still more preferably 0, 1 or 2, especially 1 or 2.

For the avoidance of doubt it is confirmed that in the above formula (iv and subsequent formulae, the unsubstituted bond ① indicates a link to a triazinylamino group in the formula (I).

Preferred alkyl groups of $R^6$ and $R^{11}$ are $C_{1-4}$alkyl groups and preferred alkoxy groups of $R^6$ are $C_{1-4}$alkoxy.

Preferred aryl groups of B are phenyl and naphthyl, optionally substituted by alkyl (more preferably $C_{1-4}$ alkyl, especially methyl), alkoxy (more preferably $C_{1-4}$alkoxy, especially methoxy), chloro, nitro, amido or sulphonic acid (or a salt thereof).

In an alternative, more preferred, range of dyes of the formula (i), in which the group E is attached to the triazinylamino group in formula (I), given and defined above, A is a phenyl or naphthyl group, optionally substituted by at least one of an alkyl (preferably $C_{1-4}$alkyl), halo (preferably chloro), cyano, hydroxy, aryloxy (preferably phenoxy), alkylsulphonyl (preferably $C_{1-4}$alkylsulphonyl), or arylsulphonyl (preferably phenylsulphonyl) group or a carboxylic or sulphonic acid group or a salt thereof; and E is an optionally substituted aryl or heteroaryl group selected from phenyl, naphthyl, pyrazolyl, pyrazolonyl, pyridyl, pyridonyl and pyrimidinyl groups or is an acetoacetamidoaryl group, which said aryl or heteroaryl group or aryl moiety of the acetoacetamidoaryl group is optionally substituted by an alkyl (preferably $C_{1-4}$alkyl), phenyl, naphthyl or amino- (which may bear a $C_{1-4}$ alkyl group), amido- or sulphonamido-phenyl or naphthyl and E may be attached to the triazinylamino group from the said substituted alkyl group, phenyl or naphthyl group or phenyl or naphthyl moiety of the said substituent, which said aryl or heteroaryl group is further optionally substituted at least so as to provide the coupling component from which the group E is derived with sufficient electron donating capacity to allow the said coupling (in general when E is a pyridyl or pyrimidinyl group, the presence of at least one electron donating group is necessary to allow coupling); and which said aryl moiety of the acetoacetamidoaryl group is optionally substituted, preferably by at least one of alkyl, alkoxy, halo, $H_2NCONH$, $CH_3CONH$ or $SO_3H$ (or a salt thereof), more preferred alkyl and alkoxy being $C_{1-4}$ alkyl and $C_{1-4}$, alkoxy.

In the above dyes, especially when A is an a-naphthol, the dye is optionally metallized.

When the group E is a phenyl or naphthyl group, still more preferably this is optionally substituted by an alkyl, alkoxy (preferably $C_{1-4}$alkoxy), ureido, acylamido (preferably $C_{2-5}$acylamido), alkylsulphonyl (preferably $C_{1-4}$alkylsulphonyl), halo (preferably chloro), hydroxyl or amino group, which amino group is optionally substituted by at least one alkyl group (preferably $C_{1-4}$alkyl), or is a carboxylic or sulphonic acid group or a salt thereof.

When the group E is a pyrazolyl, pyrazolonyl, pyridyl, pyridonyl or pyrimidinyl group, still more preferably this is substituted by a hydroxyl, mercapto or amino-group, which amino-group is optionally substituted by at least one (preferably $C_{1-4}$) alkyl group.

In an especially preferred range of such dyes, A is an optionally substituted phenyl or naphthyl group (Ar) and E is an acetoacetamidoaryl group such that at least one of $D^1$- and $D^2$- is a chromophore of the formula (iii)

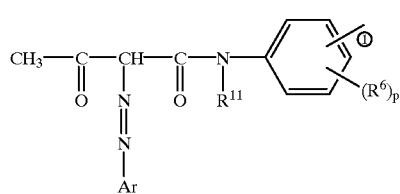

(iii)

wherein: each of $R^6$, $R^{11}$ and p, is as defined above; and

Ar is optionally substituted phenyl or naphthyl or is a chromophore, such as an azo, especially monoazo dye.

Substituents which may be on the phenyl or naphthyl group or chromophore are alkyl (more preferably $C_{1-4}$ alkyl, especially methyl), alkoxy (more preferably $C_{1-4}$ alkoxy, especially methoxy), chloro, nitro, amido or sulphonic acid (or a salt thereof.

Another preferred range of dyes of formula (i) in which the group E is attached to the triazinylamino group is a range in which, in at least one, and more preferably each, of $D_1$ and $D_2$, E is an optionally substituted phenylene group such as to provide, in the dye, at least one chromophore of the formula (v)

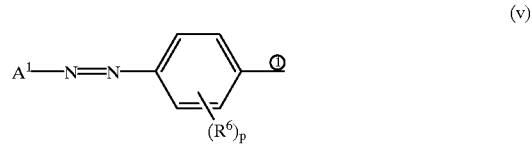

(v)

wherein:

$A^1$ is a phenyl or naphthyl group, optionally substituted by at least one of an alkyl (preferably $C_{1-4}$alkyl), halo (preferably chloro), cyano, hydroxy, aryloxy (preferably phenoxy), alkylsulphonyl (preferably $C_{1-4}$ alkylsulphonyl), or arylsulphonyl (preferably phenylsulphonyl) group or a carboxylic or sulphonic acid group or a salt thereof; and p and $R^6$ are as defined above. Most of such chromophores will be yellow in colour, as will a dye in which each of $D_1$- and $D_2$- is of the formula (v).

In the chromophores of formula (v), p may be zero but when p is 1, 2, 3 or 4, the or each $R_6$, independently, is alkyl (preferably $C_{1-4}$ alkyl), alkoxy (preferably $C_{1-4}$ alkoxy), halo, $H_2NCONH$, $H_3CCONH$ or $SO_3H$ (or a salt thereof). More preferably, p is 1, 2 or 3, especially 1 or 2, and a still more preferred range of such chromophores has the formula (vi)

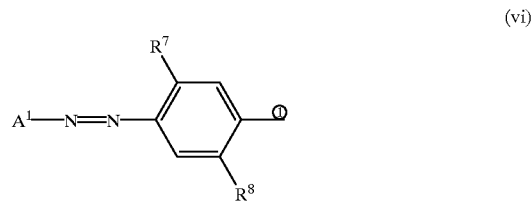

(vi)

wherein: $A^1$ is as defined above;

$R^7$ is alkyl (preferably $C_{1-4}$ alkyl), alkoxy (preferably $C_{1-4}$ alkoxy), halo, $H_2NCONH$ or $H_3CCONH$; and $R^8$ is H, alkyl (preferably $C_{1-4}$ alkyl), alkoxy (preferably $C_{1-4}$ alkoxy) or halo.

In an especially preferred range of chromophores of formulae (v) and (vi), $R^7$ is $H_2NCONH$, and more especially $R^8$ is then hydrogen.

In preferred ranges of chromophores of the formula (v), $A^1$ is an optionally substituted phenyl or naphthyl group which, more preferably, is substituted by at least one $SO_3H$ group, or a salt thereof. Still more preferably, with reference to the formula (I), given and defined above, x is zero, y is 1 and b is 2 or 3.

Preferred starting materials for providing, a yellow chromophore of the formula (v) are (1) a diazotizable amine component capable of diazotization and coupling to a coupling component and (2) a coupling component to which the diazotized amine component can couple and also containing an amino group for reaction with a cyanuric halide, especially cyanuric chloride or fluoride, for attachment of the chromophore to the triazinylamino group.

Suitable diazo components are, for example, aniline, orthanilic acid, metanilic acid and sulphanilic acid, 2-aminobenzene-1,4-disulphonic acid, 2-aminobenzene-1,5-disulphonic acid, 2-amino-5-methylbenzene-1sulphonic acid, 2-amino-5-methoxybenzene-1-sulphonic acid, 2-aminobenzoic acid and 3-chloro-4-aminobenzene-1-sulphonic acid and α- and β-naphthylamines substituted by at least one of sulphonic acid, carboxylic acid, halo, alkyl (especially $C_{1-4}$ alkyl), acylamino (especially $C_{2-5}$acylamino), cyano and aminoalkyl (especially amino $C_{1-4}$alkyl), such as 2-aminonaphthalene-1-sulphonic acid, 2-aminonaphthalene-1,5-disulphonic acid, 2-aminonaphthalene-4,8-disulphonic acid and 2aminonaphthalene-3,6,8-trisulphonic acid.

Suitable coupling components are, for example, 3-ureidoaniline, 3acetylaminoaniline, and 2,5-substituted anilines in which one of the respective substituents, independently, is selected from methyl, methoxy and halo (especially chloro) and the other from methyl, methoxy and acetylacetamino.

The reaction may be carried out, for example, by diazotizing a diamine component having one protected amine, coupling it to the coupling component, releasing the protected amine, then reacting the resultant dyestuff firstly with a cyanuric halide, especially cyanuric chloride or fluoride, and then with an aminoalkylpiperazine. Alternatively, a diamine containing one hindered and one unhindered amine group may be allowed to react with an equivalent of cyanuric halide and the resultant product diazotized and coupled onto the coupling component prior to subsequent reaction with the aminoalkylpiperazine.

In an especially preferred range of yellow dyestuffs, each of $D^1$- and $D^2$- is a chromophoric group of the formula

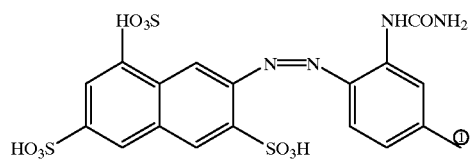

(ii)

A most preferred yellow dye has the formula (1)

In chromophores of the formula (v), E may be an optionally substituted heteroaryl group such as a pyrazole, pyrimidine or a pyridine, especially a pyridone derivative which, when E is attached to the triazinylamino group, is provided by an amino substituted derivative capable of reaction with a cyanuric halide, especially cyanuric chloride or fluoride, for attachment of the chromophoric group.

Thus, in yet another preferred range of chromophores of the formula (v) in which A is attached to the triazinylamino group, E may be an optionally substituted heteroaryl group, for example, a group of the formula (vii)

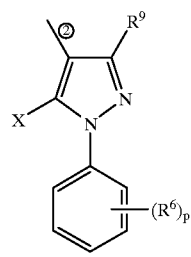

(vii)

wherein: p and $R^6$ are as defined above;

X is OH or $NH_2$; and $R^9$ is methyl, carboxyl or methoxycarbonyl; or

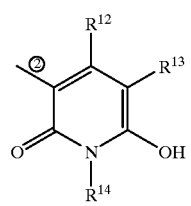

(viii)

wherein $R^{12}$ is hydrogen, $C_{1-4}$ alkyl or phenyl; $R^{13}$ is hydrogen, $CONH_2$, CN, $C_{1-4}$alkyl or $CH_2SO_3H$; and $R^{14}$ is $C_{1-4}$alkyl or phenyl; or (1)

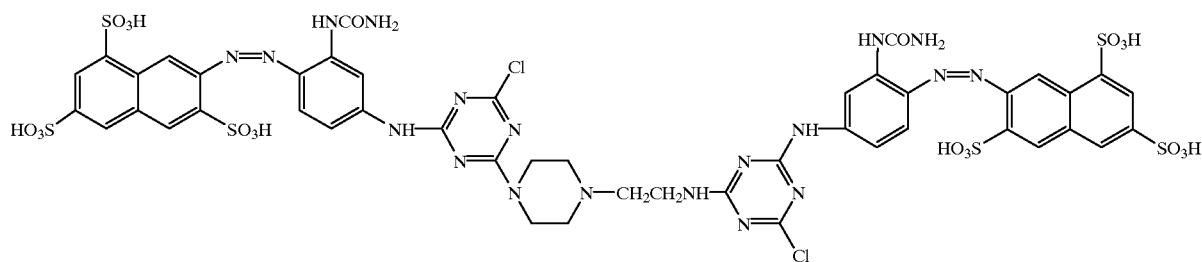

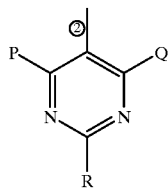

(ix)

wherein each of P, Q and R, independently, is hydrogen, $C_{1-4}$alkoxy, hydroxy, $C_{1-4}$alkylthio, mercapto, amino, $C_{1-4}$alkylamino or (di-$C_{1-4}$alkyl)amino; and
wherein, in each of formulae (vii)–(ix), the bond ② is attached to the monoazo group.

In still another preferred range of dyes of formula (v) in which E is attached to the triazinylamino group, E is a heteroaryl or heteroaralkyl group, for example, a heteroaryl group of the formula (x)

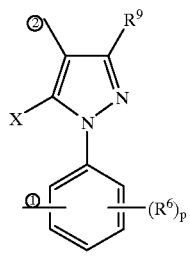

(x)

wherein p, $R^6$, $R^9$ and X are as defined above;
or E is a hetero or heteroaralkyl group of the formula (xi)

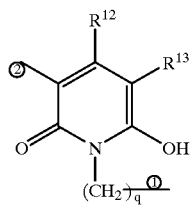

(xi)

wherein $R^{12}$ and $R^{13}$ are as defined above and q is zero or is 1–4; and in each of formulae (x) and (xi), the bond ② is attached to the monoazo group.

In another preferred range of monoazo dyes, at least one of, and more preferably, each of $D^1$ and $D^2$, independently, is a monoazo chromophore of the formula (xii)

$$A^1—N=N—E^1 \quad (xii)$$

wherein: $A^1$ is a phenyl or naphthyl group optionally substituted by at least one of an alkyl (preferably $C_{1-4}$alkyl), halo (preferably chloro), cyano, hydroxy, aryloxy, alkylsulphonyl or arylsulphonyl group or a carboxylic or sulphonic acid group or a salt thereof; and $E^1$ is a hydroxy naphthyl group, optionally substituted by at least one sulphonic acid group or a salt thereof, and optionally additionally substituted by halo, preferably chloro, hydroxyl, methyl or acylamino (preferably a $C_{2-5}$acylamino) group.

More preferably, the group $A^1$ is substituted by at least one $SO_3H$ group or a salt thereof, and also more preferably, the group El is substituted by at least one group selected, independently, from $SO_3H$ (and salts thereof) and $CH_3$. Still more preferably, with reference to the formula (1), given and defined above, x is zero, y is 1 and b is 2 or 3.

In a more preferred range of dyes of the formula (xii), the group E has the formula (xiii)

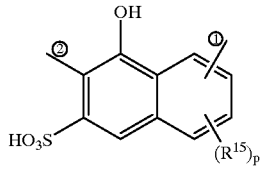

(xiii)

or has the formula (xiv)

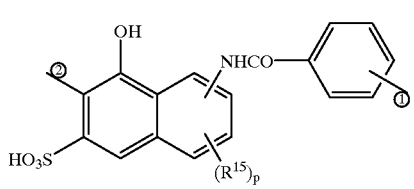

(xiv)

wherein, in each formula (xiii) and (xiv), the or each $R^{15}$ is halogen, methyl, acylamino or $SO_3H$ or a salt thereof and p is as defined above; and the bond (is attached to the monoazo group.

Preferred starting materials for providing a red or orange chromophore of the formula (xiii) are, as mentioned above in relation to the yellow chromophores, diazotizable amine components and coupling components having an amino group for reaction with a cyanuric halide.

Suitable diazo components are, for example, those mentioned above for the yellow chromophores.

Suitable coupling components for the red or orange chromophores are, for example, 1-amino-8-hydroxynaphthalene-3,6-disulphonic acid (H-acid), 1-amino-8-hydroxynaphthalene-2,6-disulphonic acid (K-acid), 2-amino-8-hydroxynaphthalene-6-sulphonic acid (y-acid) or the corresponding N-methyl derivative (Me-y-acid), 3-amino-8-hydroxynaphthalene-6-sulphonic acid(J acid) or the corresponding N-methyl derivative (Me-J-acid), 2-amino-8-hydroxynaphthalene-3,6disulphonic acid, (2R- or sulpho-y-acid) and 3-amino-8-hydroxynaphthalene-4,6-disulphonic acid (sulpho-J-acid).

Especially preferred red dyes have the respective formulae (2), (3) and (4):

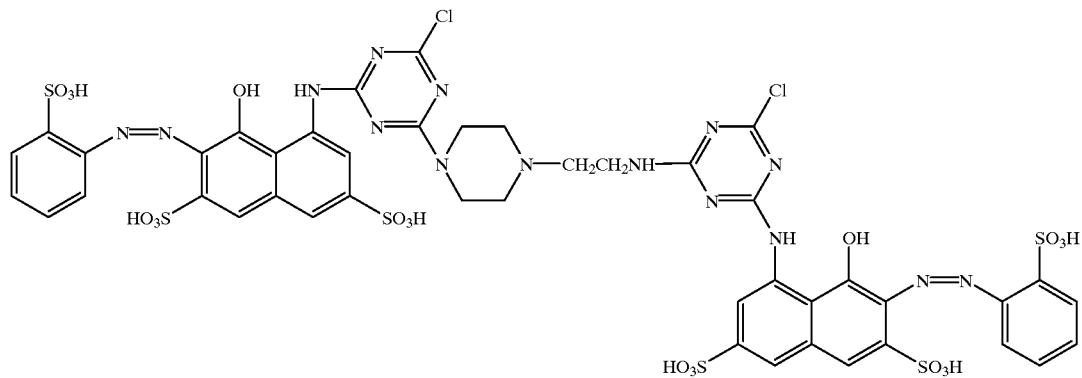
(2)
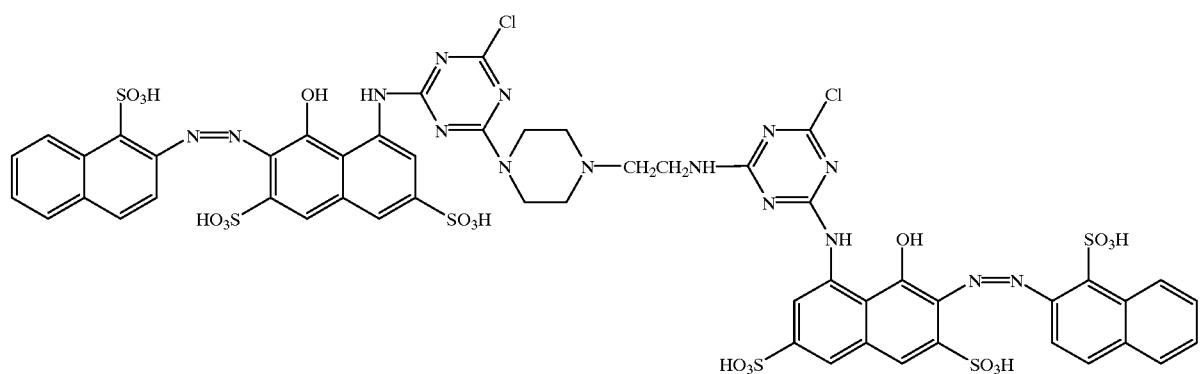
(3)
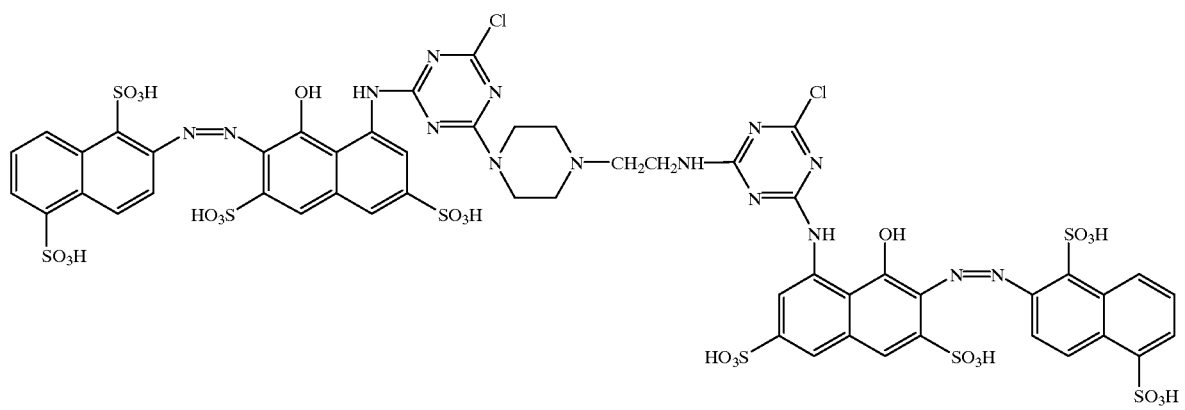
(4)

In another preferred range of monoazo chromophores, at least one and more preferably each of $D^1$- and $D^2$-, independently, is a coppered monoazo chromophore of the formula (xv)

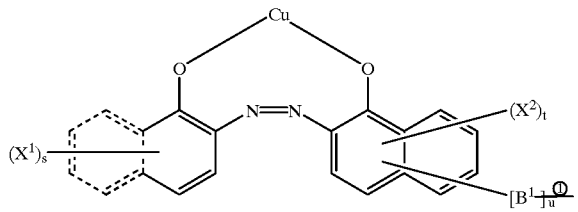

(xv)

wherein $X^1$ is a sulphonic acid group (or a salt thereof), a carboxyl group (or a salt thereof), or an alkyl (preferably $C_{1-4}$alkyl) or alkoxy (preferably $C_{1-4}$alkoxy) group or a halogen (preferably chlorine) atom;

$X^2$ is a sulphonic acid group;

$B^1$ is an optionally substituted phenylene or naphthalene group linked to the naphthalene nucleus either directly or through an optional substituent and linked to the triazinylamino group either directly or through an optional substituent;

s is zero or is 1-4;

t is zero or is 1-3; and u is zero or 1.

Most of such chromophores will be navy in colour, as will a dye in which each of $D_1$- and $D_2$- is of the formula (xv).

Preferred substituents linking the group $B^1$ to the naphthalene nucleus are $C_{1-4}$ alkylene, amino (optionally bearing a $C_{1-4}$ alkyl group), amido and sulphonamido and other preferred substituents on $B^1$ are alkyl (more preferably $C_{1-4}$ alkyl, especially methyl), alkoxy (more preferably $C_{1-4}$ alkoxy, especially methoxy), chloro, nitro, amido or sulphonic acid (or a salt thereof).

More preferably, the coppered monoazo chromophore has the formula (xvi)

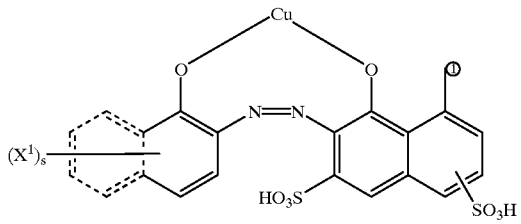

(xvi)

where $X^1$ and s are as defined above.

Preferred starting materials for providing a navy monoazo chromophore of the formula (xv) are diazotizable amine components containing a hydroxyl or methoxy group available for metallization and a coupling component also having an amino group for reaction with a cyanuric halide, especially cyanuric chloride or fluoride, as well as a site or substituent available for metallization.

The choice of the diazotizable amine component and coupling component may depend upon the method of metallization employed. For example, if metallization is to be carried out by oxidative demethylation, the diazotizable amine component will have a methoxy group adjacent to the amino group and the coupling component will be an a-naphthol compound. Alternatively, if oxidative metallization is to be carried out, the diazotizable amine component will have a hydrogen atom adjacent to the amino group and the coupling component will be an a-naphthol compound. As another alternative, the diazotizable amine and coupling component may both have a hydroxyl group substituent so that, in the chromophore, respective hydroxyl groups are provided ortho to the azo linkage for complex formation with the metal.

Suitable diazotizable amine components for the navy chromophores are, for example, 1-hydroxy-2-aminobenzene-4-sulphonic acid, 1-hydroxy-2-aminobenzene-4-(β-sulphatoethyl sulphonyl) benzene, 1-hydroxy-2-aminobenzene-4,6-disulphonic acid, 1-hydroxy-2-amino-4-methoxy-5-(β-sulphatoethylsulphonyl) benzene, 1-amino-2-hydroxy naphthalene-4-sulphonic acid, 1-hydroxy-2-amino-naphthalene-3,6-disulphonic acid, 1-hydroxy-2-amino-naphthalene-4,8-disulphonic acid, 1-hydroxy-2-amino-naphthalene-4,6,8-trisulphonic acid and 1-hydroxy-2-amino-8-(β-sulphatoethylsulphonyl) naphthalene-6-sulphonic acid.

Suitable coupling components are, for example, H-acid and K-acid.

In a further alternative range of preferred dyes, each of $D^1$ and $D^2$ is a disazo chromophore, or a metallized derivative thereof. Such chromophores may yield, for example dyes having an especially good deep blue or navy colour.

In one preferred range of disazo dyes, at least one and more preferably each of $D^1$ and $D^2$, independently, is a disazo chromophore of the formula (xvii)

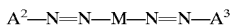

(xvii)

$$A^2-N=N-M-N=N-A^3$$

wherein one of $A^2$ and $A^3$ is attached to the triazinylamino group and each of $A^2$ and $A^3$, independently, is a phenyl or naphthyl group, optionally substituted by at least one group, independently, selected from sulphonic acid (or a salt thereof), carboxylic acid (or a salt thereof, alkyl, acylamino (preferably $C_{2-5}$acylamino and especially acetylamino), halo, alkylsulphonyl and alkylsulphonylamino groups (where each alkyl group or moiety is preferably $C_{1-4}$ alkyl); and M is a naphthalene group substituted by at least a hydroxyl and an amino group and optionally substituted by at least one sulphonic acid group.

Most of such chromophores will be navy in colour, as will a dye in which each of $D_1$ and $D_2$ is of the formula (xvii).

More preferably, M is a group of the formula (xviii)

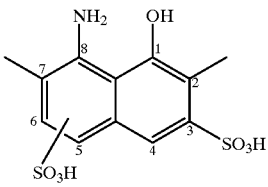

(xviii)

where the sulphonic acid group in the 8-amino-substituted ring is in the 5- or 6-position.

Preferred starting materials for providing a chromophore of the formula (xvii) are (1) a first diazotizable amino component for diazotization and coupling to provide whichever of the groups $A^2$ and $A^3$ is to provide a terminal end of the dye remote from a triazinylamino group, (2) a second diazotizable amino component having one amino group (or a group capable of conversion to an amino group) for diazotization and coupling to provide whichever of the groups $A^2$ and $A^3$ is to react with a cyanuric halide, especially cyanuric chloride or fluoride, and additionally having another amino group (or a group capable of conversion to an amino group) for reaction with the cyanuric halide and (3) a coupling component to provide the group M.

Especially preferred coupling components for providing the group M are 1-hydroxy-8-amino-naphthalene-3,5- and 3,6-disulphonic acid (K and H acids respectively).

Suitable amine compounds (1) for diazotization to provide the terminal group are aniline, mono- and disulphonic acids, for example, orthanilic, metanilic and sulphanilic acids, 2-amino-5-methylbenzenesulphonic acid, 2-amino-4-methyl benzenesulphonic acid, 2-chloro-4-amino benzenesulphonic acid, 2-amino-3-chloro-1,5-disulphonic acid, 2-amino-1,5-disulphonic acid, 1-amino-3-(β-sulphatoethylsulphonyl)benzene and 1-amino-4-(β-sulphatoethylsulphonyl) benzene, and α- or β-naphthylamines having up to 4 substituents, for example, 2-aminonaphthalene-1,5-disulphonic acid, 2-aminonaphthalene-4,8disulphonic acid and 2-aminonaphthalene-3,6,8-trisulphonic acid.

Suitable diamines (2) for, on the other hand, reaction with a cyanuric halide followed by diazotization and coupling are 2,4diaminobenzene-1-sulphonic acid, 2,5-diaminobenzene-1-sulphonic acid, and 2-amino-5-aminomethylnaphthalene-1-sulphonic acid.

In another preferred range of disazo dyes, at least one and more preferably each of $D^1$ and $D^2$, independently, is a disazo chromophore of the formula (xix)

$A^2-N=N-M^1-N=N-E^2$ (xix)

wherein one of $A^2$, $M^1$ and $E^2$ is attached to the triazinylamino group; $A^2$ is as defined above;

$M^1$ is an optionally substituted 1,4-phenylene or 1,4naphthalene group; and $E^2$ is an optionally substituted 1–4-phenylene or 1,4naphthalene group.

For each of $M^1$ and $E^2$ the optional substituent, independently, is preferably at least one group selected from an alkyl (preferably $C_{1-4}$alkyl), alkoxy (preferably $C_{1-4}$alkoxy), halo (preferably chloro) and an acylamino (preferably $C_{2-5}$acylamino) group and a sulphonic acid group and a salt thereof.

Most of such chromophores will be brown in colour, as will a dye in which each of $D_1$ and $D_2$ is of the formula (xx).

More preferably, each of $M^1$ and $E^2$, independently, is a group of the formula (xx)

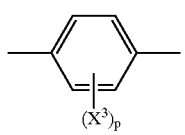

(xx)

wherein the or each $X^3$, independently, is alkyl, alkoxy, acetylamino or alkylsulphonylamino (and each alkyl group or moiety is preferably $C_{1-4}$alkyl), and p is zero or 1–4, more preferably zero or 1–3, still more preferably zero, 1 or 2; or a group of the formula (xxi)

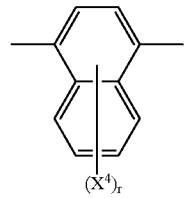

(xxi)

wherein the or each $X^4$, independently, is alkyl (preferably $C_{1-4}$alkyl), alkoxy (preferably $C_{1-4}$alkoxy), halo, sulphonic acid (or a salt thereof) or carboxyl (or a salt thereof) and r is zero or 1-4, preferably zero or 1–3, still more preferably zero, 1 or 2.

Preferred starting materials for providing a chromophore of the formula (xix) are (1) a diazotizable amine component for diazotization and coupling to provide the group $A^2$, (2) an amine compound for providing the group $M^1$ onto which the diazotized amine compound (1) is to be coupled and which in turn is to be diazotized and coupled to a coupling component and (3) a coupling component. Whichever of components (1)–(3) is to react with a cyanuric halide, especially cyanuric chloride or fluoride, for attachment of the chromophore to the triazinylamino group will have an amino group for reaction with the cyanuric halide.

Suitable diazotizable amine components (1) for diazotization to provide the group $A^2$ are those given above with reference to the formula (xvii).

Suitable diazotizable amine components (2) to which the diazotized amine components (1) are coupled and which can be further diazotized are aniline, 2- or 3-methyl aniline, 2,5-dimethyl aniline, 2,5-dimethoxy aniline, 2-methyl-5-methoxy aniline, 3-aminoacetanilide and 1-aminonaphthalene-6- and -7- sulphonic acids.

When coupling component (3) is the component for further reaction with the cyanuric halide, preferred such coupling components are 2,5-dimethyl aniline and 1-aminonaphthalene-6-, and -7- and -8- sulphonic acids.

In yet another preferred range of disazo chromophores, at least one and more preferably each of $D^1$- and $D^2$-, independently, is a coppered disazo chromophore of the formula (xxii)

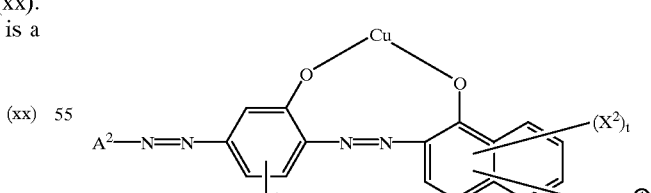

(xxii)

wherein each of $A^2$, $X^1$, $X^2$, B, s, t and u are as defined above.

Most such chromophores will be navy in colour, as will a dye in which each of $D^1$- and $D^2$- is of the formula (xxii).

More preferably, the coppered disazo chromophore has the formula (xxiii)

(xxiii)

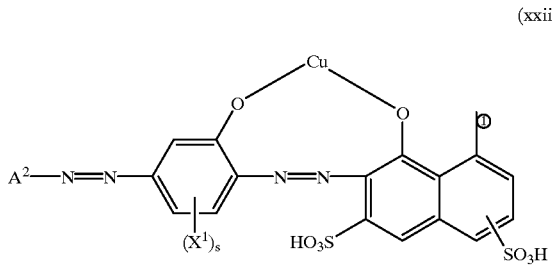

wherein $A^2$, $X^1$ and s are as defined above.

Preferred starting materials for providing a metallized chromophore of the formula (xxii) are (1) a diazotizable amine component for diazotization and coupling to provide the group $A^2$, (2) a compound to which the diazotizable amine components (1) may be coupled and having each of an amino group for further diazotization and coupling and a hydroxy or methoxy group for metallization and (3) a coupling component which is a naphthalene derivative containing an amino group for further reaction with a cyanuric halide especially cyanuric chloride or fluoride, and at an α-position a hydroxyl group or a free site such as to allow metallization.

Suitable amine compounds (1) for diazotization for providing the group $A^2$ are those given above with reference to chromophore of the formula (xvii).

Suitable amine compounds (2) onto which the above diazo compounds are coupled and which are further coupled to the coupling component (3) are 1-amino-2-methoxy benzene, 1-amino-2-methoxy-5methyl benzene and 1-amino-2,5-dimethoxy benzene.

Suitable coupling components (3) are H-acid and K-acid.

A dye in accordance with the invention may be prepared by a process which comprises reacting a piperazine of the formula (II)

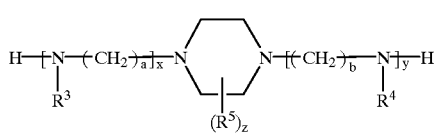
(II)

wherein each of $R^3$, $R^4$, $R^5$, x, y, a, b and z are as defined above, with an equimolar proportion of each of two reactive dyes respectively of the formulae (III)

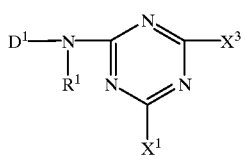
(III)

wherein each of $D^1$, $R^1$ and $X^1$ are as defined above and $X^3$ is a labile atom or group capable of reaction with an amine, and (IV)

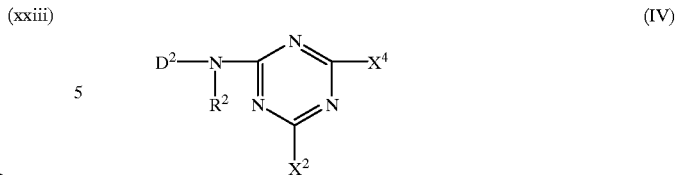
(IV)

wherein each of $D^2$, $R^2$ and $X^2$ is as defined above and $X^4$ is a labile atom or group capable of reaction with an amine, or, when each of $D^1$, $R^1$, $X^1$ and $X^3$ is the same as $D^2$, $R^2$, $X^2$ and $X^4$ respectively, with two moles of a reactive dye of the formula (II) or (IV) per mole of the piperazine of the formula (II), to obtain the dye of the formula (I).

Although dye formulae have been shown in the form of their free acid in this specification, the invention also includes dyes and processes using dyes in the salt form, particularly their salts with alkali metals such as the potassium, sodium, lithium or mixed sodium/lithium salt.

The dyes may be used for dyeing, printing or ink-jet printing, for example, of textile materials and paper.

The process for colouration is preferably performed at a pH of 7.1 to 13, more preferably 10 to 12. pH levels above 7 can be achieved by performing the process for colouration in the presence of an acid-binding agent.

The substrate may be any of a textile material, leather, paper, hair or film, but is preferably a natural or artificial textile material containing amino or hydroxyl groups, for example textile material such as wool, silk, polyamides and modified polyacrylonitrile fibres, and more preferably a cellulosic textile material, especially cotton, viscose and regenerated cellulose, for example, that commercially available as Tencel. For this purpose the dyes can be applied to the textile materials at a pH above 7 by, for example, exhaust dyeing, padding or printing. Textile materials are coloured bright shades and possess good fastness to light and wet treatments such as washing.

The new dyes are particularly valuable for colouring cellulosic textile materials. For this purpose, the dyes are preferably applied to the cellulosic textile material at a pH above 7 in conjunction with a treatment with an acid-binding agent.

Preferred acid-binding agents include alkali metal carbonates, bicarbonates, hydroxides, metasilicates and mixtures thereof, for example sodium bicarbonate, sodium carbonate, sodium metasilicate, sodium hydroxide and the corresponding potassium salts. The dyes benefit from excellent build-up and high fixation.

At least for cellulosic materials, dyeing may be carried out at a somewhat higher temperature of about 90° C., as compared with dyeing carried out with conventional monochlorotriazine exhaust dyes which are generally dyed at temperatures of about 80° C. Although more energy is required, particularly improved migration is obtained.

The new dyes can be applied to textile materials containing amine groups, such as wool and polyamide textile materials, from a neutral to mildly alkaline dyebath. The dyeing process can be carried out at a constant or substantially constant pH, that is to say the pH of the dyebath remains constant or substantially constant during the dyeing process, or if desired the pH of the dyebath can be altered at any stage of the dyeing process.

The dyes may be in liquid or solid form, for example in granular or powdered form.

We find surprisingly that such dyes provide the following advantageous properties:

a) excellent build-up;
b) very strong dyeing;
c) good robustness to changes in dyeing conditions, especially temperature;
d) good wash off;
e) good fixation; and
f) good aqueous solubility.

Especially preferred embodiments of the invention will now be described in more detail with reference to the following Examples in which all parts and percentages are by weight unless otherwise stated. Although preparation and dyeing with any single dye is exemplified, particular advantages can be seen when dyeing with mixtures of dyes.

EXAMPLE 1

A solution of a yellow dichlorotriazine dye (10) (0.021 mol) in water (315 mls) was added over 15 mins to a stirred solution of 1-(2-aminoethyl) piperazine (15) (1.31 g, 0.01 mol) in water (100 mls) at room temperature and maintained at pH 10 by the addition of 2N NaOH solution. After addition of the dye (10) the mixture was held at room temperature and pH 10 overnight.

The pH was adjusted to 6 with 2N HCl and the dye precipitated by the addition of methylated spirit. The precipitated dye was filtered off and dried to give the expected dye (1) (9.4g) ($\lambda$max=426nm $\epsilon$=55600 $\lambda\frac{1}{2}$=113 nm).

Analytical data were in full agreement with the expected structure.

The above reaction may be represented by:

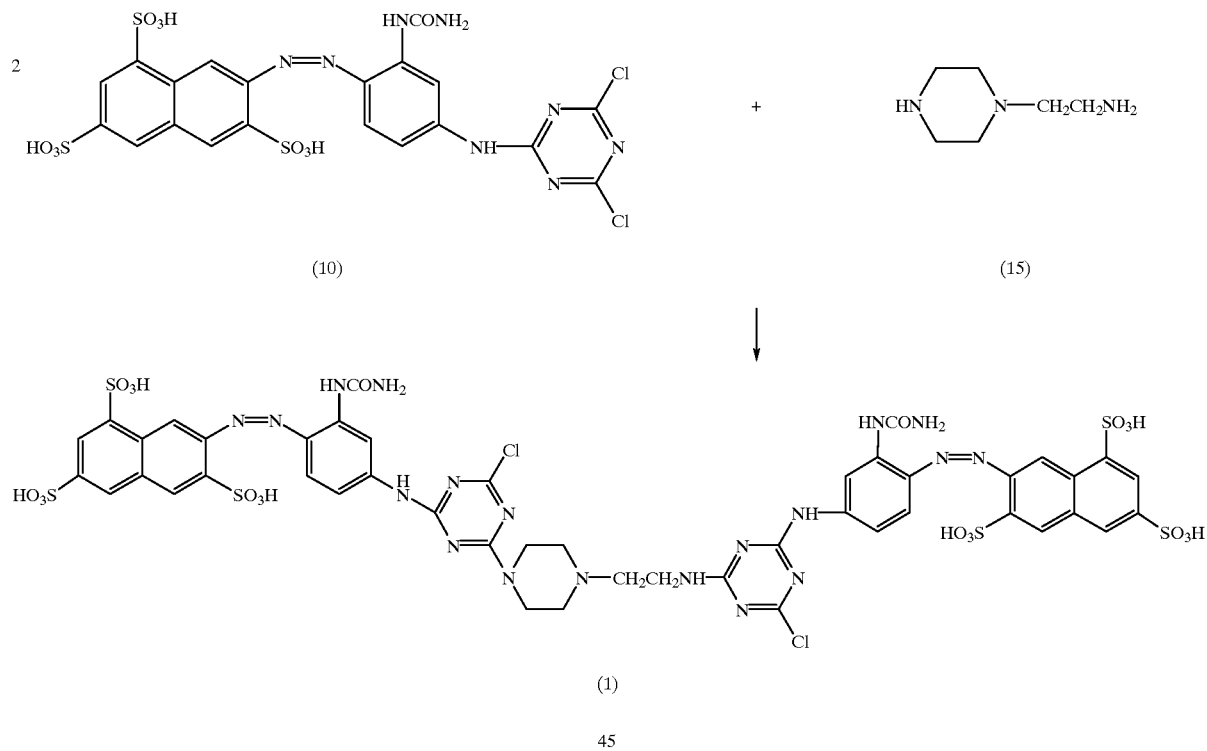

EXAMPLE 2

A mixture of a red dichlorotriazine dye (11) (0.02 mol) and N-(2-aminoethyl) piperazine (15) (0.01 mol) in water (500 mls) at room temperature was adjusted to pH 10 and maintained at pH 10 by the addition of 2N NaOH solution whilst stirring overnight. The reaction mixture was adjusted to pH 7 and the dye precipitated by the addition of methylated spirit. The precipitate was filtered off and dried to give the expected red dye (2) (15.2g) ($\lambda$max=505 nm $\epsilon$=52550 $\lambda\frac{1}{2}$=92 nm). All analytical data were in full agreement with the expected structure.

The above reaction may be represented by:

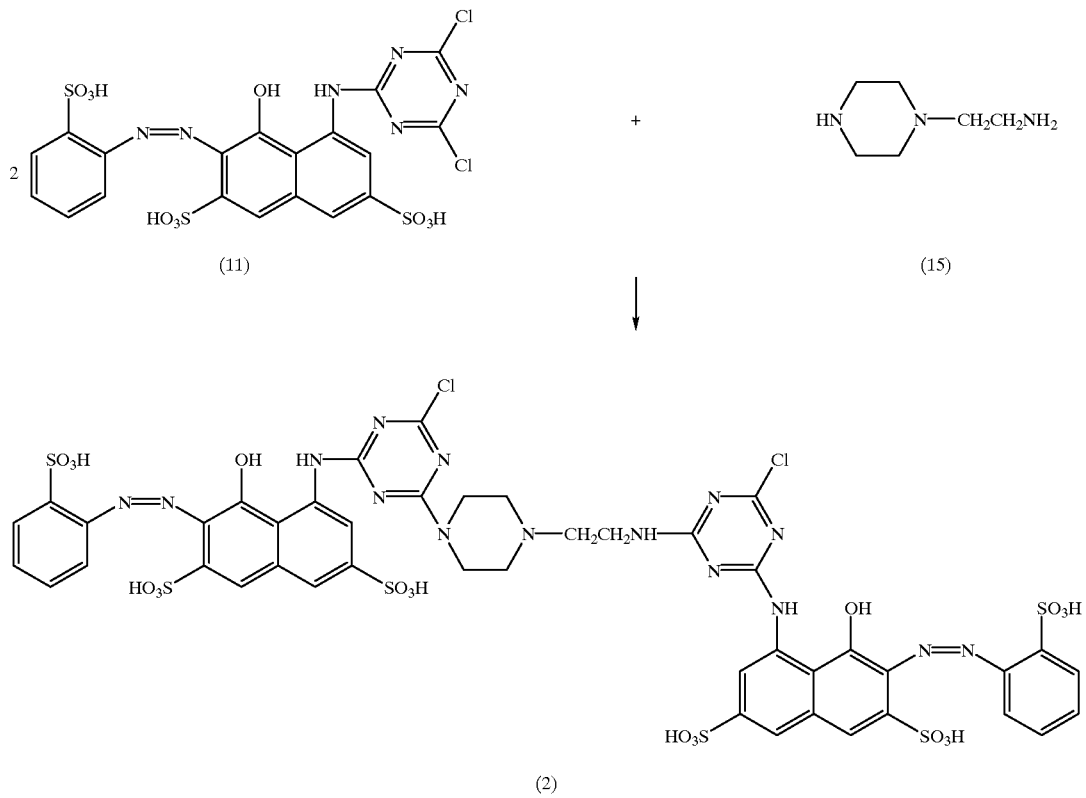
EXAMPLE 3
Following exactly the same procedure as in Example 2, but replacing red dye (11) with red dye (12), yielded red dye (3) (22.4g) ($\lambda$max=516 nm $\epsilon$=55500 $\lambda\frac{1}{2}$=93 nm). Analytical data were in full agreement with the expected structure.
The above reaction may be represented by:
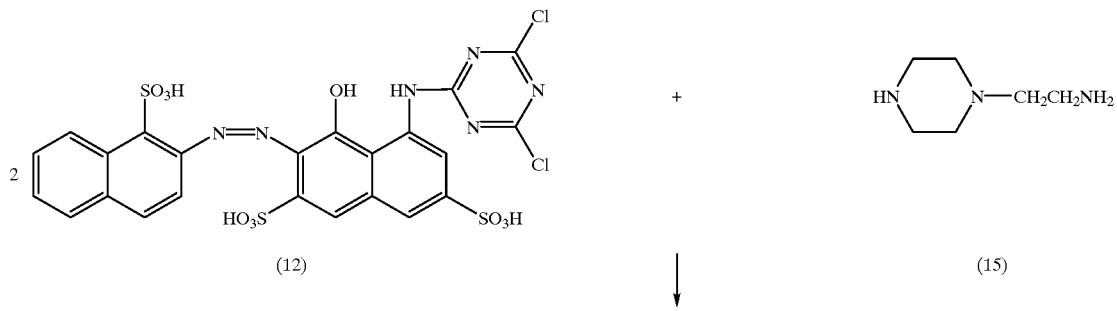

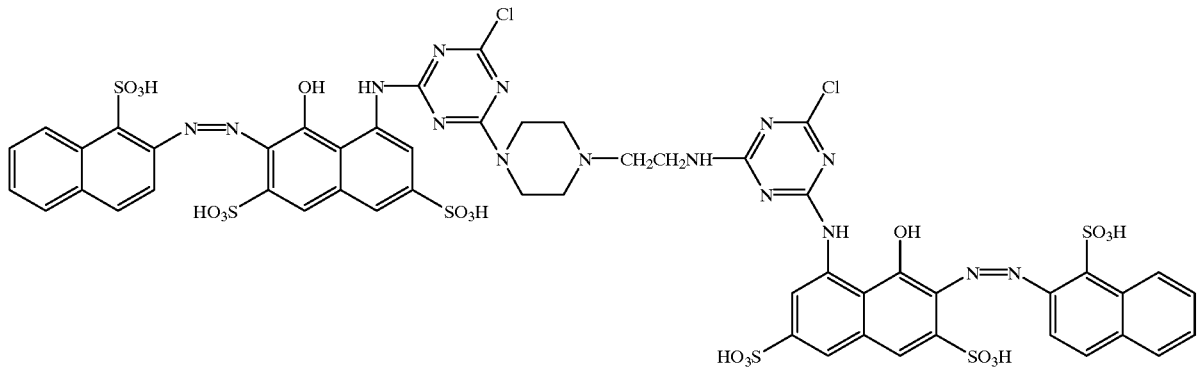

(3)

EXAMPLE 4

Following exactly the same procedure as in Example 2, but replacing red dye (11) with red dye (13), yielded red dye (4) (32.4 g) λmax=510 nm ε=74000 λ½=89 nm. Analytical data were in full agreement with the expected structure.

The above reaction may be represented by:

dropwise at pH 6 and at 50C and stirred for 6 hours at 5° C., and the mixture was allowed to assume room temperature, after which the mixture was screened through glass fibre to give a solution of the navy dichlorotriazine dye (14).

1-(2-Aminoethyl) piperazine (15) (0.33 ml) in water (50 mls) was added to the reaction mixture and the pH adjusted and maintained at pH 10 with 2N $Na_2CO_3$. The reaction

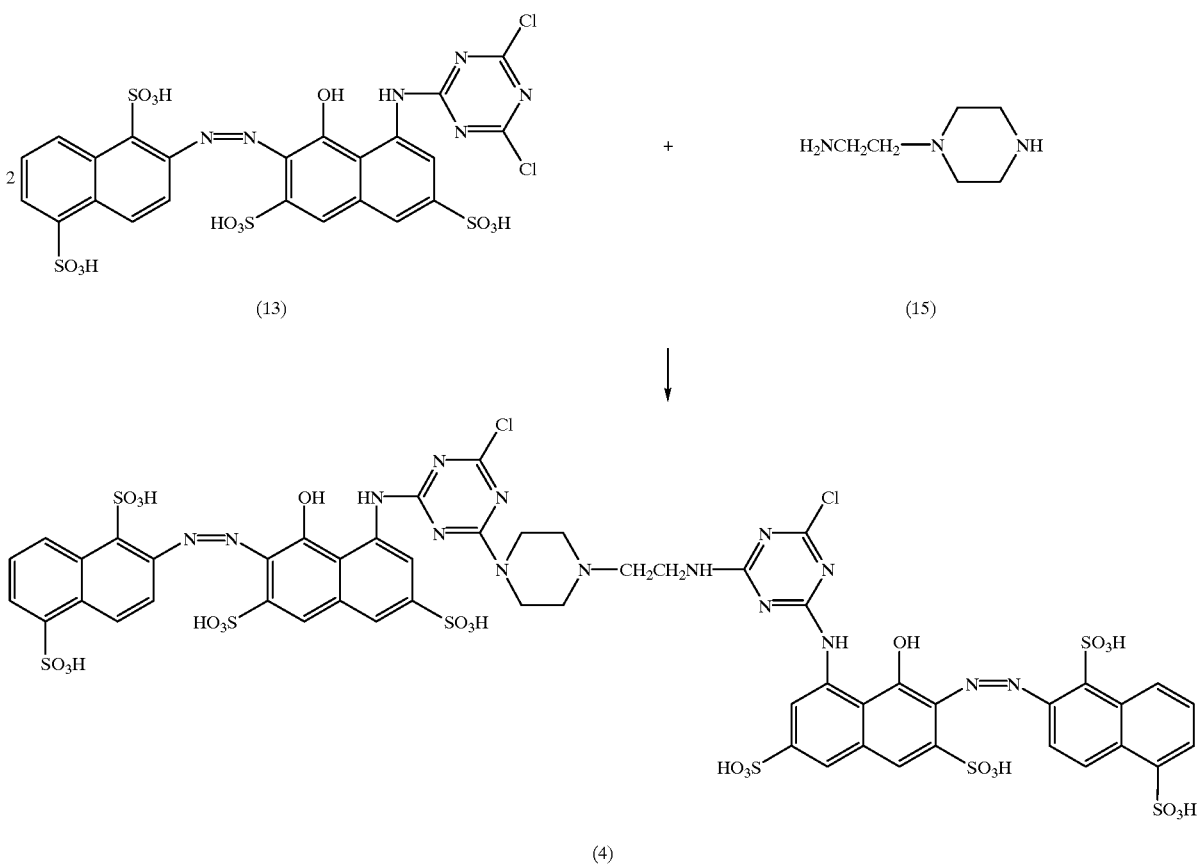

(4)

EXAMPLE 5

Cyanuric chloride (1.4 g) in acetone (30 ml) was added dropwise to ice water (100 g). A solution of a navy disazo dye base (16) (15 g, MI 2986) in water (300 ml) was added mixture was stirred at room temperature and pH 10 for 16 hours, then adjusted to pH 7 with 2N HCl.

The mixture was dialysed, evaporated to concentrate, and methylated spirits (700 ml) was added to form a precipitate which was washed with methylated spirits and dried to yield 5.7 g of a dye (5) (MI 2865; λmax 613; εmax 94070; λ½ 112 nm).
All analytical data were in full agreement with the structure.
The above reactions may be represented by:
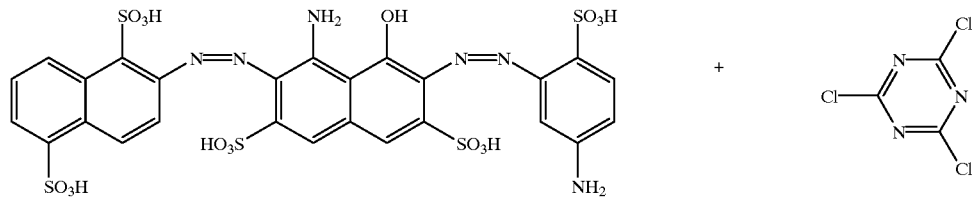
(16) + (17)
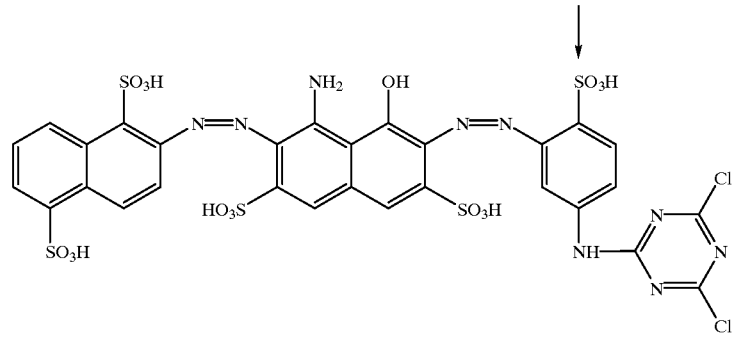
(14)
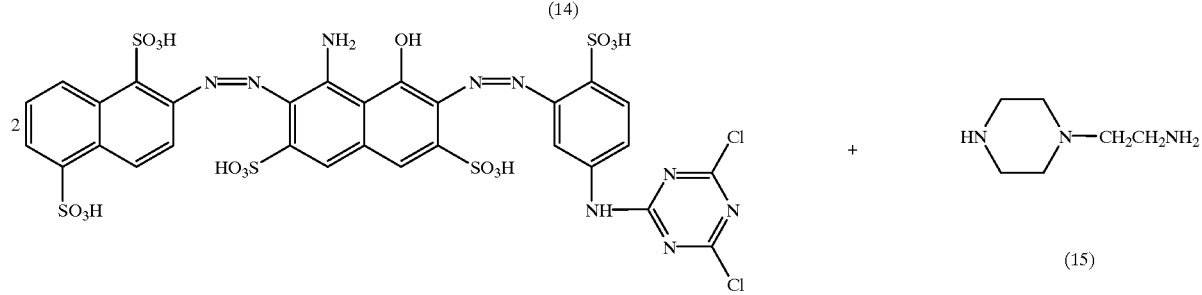
(14) + (15)
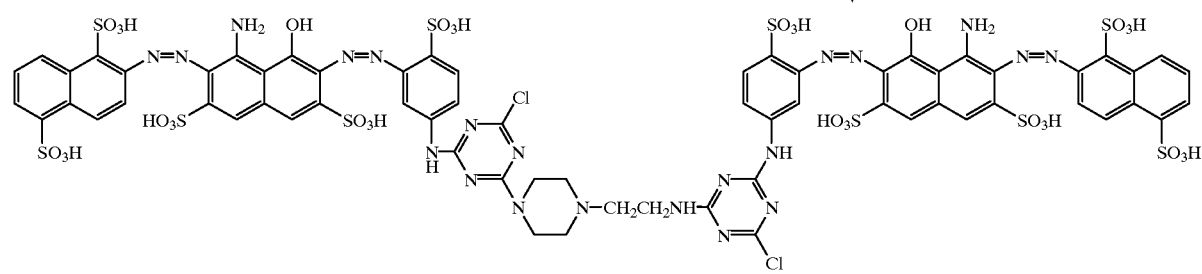
(5)

EXAMPLES 6–10

Each of the dyes prepared in Examples 1–5 was applied to cotton by exhaust dyeing at 80° C., 90° C. or 100° C., at a liquor:goods ratio of 10:1 and in the presence of salt and soda ash. In each case, the dye was found to have excellent build-up, extremely high fixation efficiency and good fastness properties.

EXAMPLES 11–22

When the navy dyebase of Example 5 of formula (16) was replaced by alternative navy dyebases, Dye-H, listed in the following Table, analogues of Example dye (5) shown in the Table following were prepared. Following the procedure of Examples 6–10, these dyes gave navy coloured cotton with excellent fastness and build-up properties, with high fixation efficiency.

In the following Table, each final tetrakisazo dye for which $\lambda$max and $\Sigma$max values are given had the formula

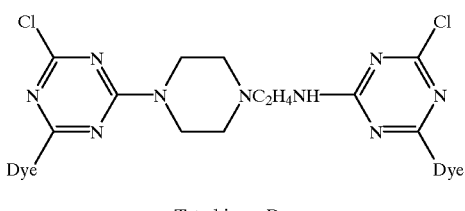

Tetrakisazo Dye

| Example | Dye-H | $\lambda_{max}$ | $\epsilon_{max}$ |
|---|---|---|---|
| 11 | | 600 | 89000 |
| 12 | | 614 | 100000 |
| 13 | | 507 | 74000 |
| 14 | | 601 | 78000 |
| 15 | | 603 | 87000 |
| 16 | | 600 | |

-continued

| Example | Dye-H | $\lambda_{max}$ | $\epsilon_{max}$ |
|---|---|---|---|
| 17 | (structure) | 605 | |
| 18 | (structure) | 592 | 100000 |
| 19 | (structure) | 614 | 78000 |
| 20 | (structure) | 602 | 56000 |
| 21 | (structure) | 602 | 86000 |
| 22 | (structure) | 606 | 66000 |

EXAMPLES 23–25

Other dyes which may be similarly prepared are as follows:

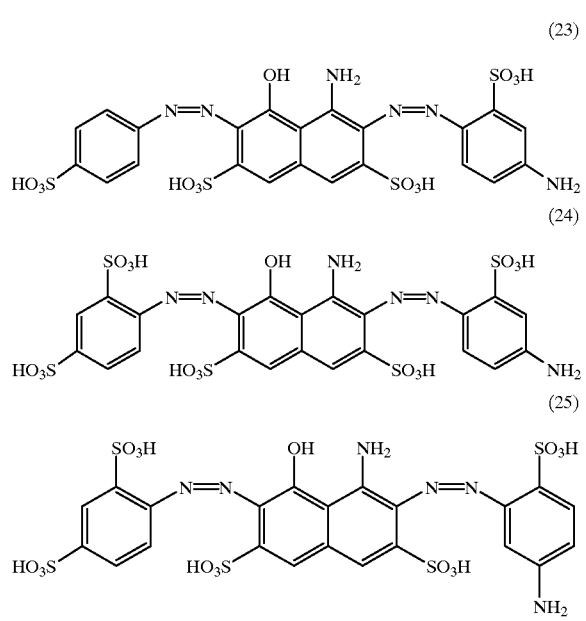

What is claimed is:

1. A dye of the formula (I)

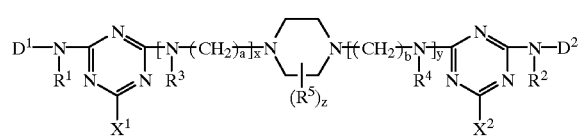

wherein:
- each of $R^1$, $R^2$, $R^3$ and $R^4$ independently, is H or an optionally substituted alkyl group;
- each of $X^1$ and $X^2$, independently, is a labile atom or group;
- each of x and y, independently, is 0 or 1 and at least one of x and y is 1;
- each of a and b, independently, is 2 to 5;
- z is zero or is 1 to 4; and
- when each of x and y is 1, a>b;
- the or each $R^5$, independently, is alkyl;
- each of $D^1$ and $D^2$, independently, is a monoazo or polyazo chromophore, or a metallized derivative thereof, provided that the dye of the formula (I) is other than a dye of the formula (20)

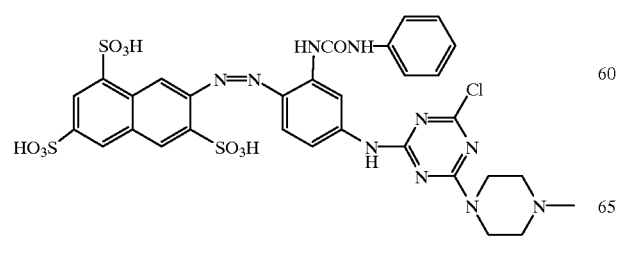

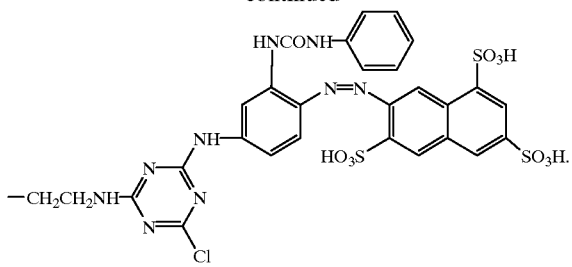

2. A dye according to claim 1, wherein x is 0 and y is 1.
3. A dye according to claim 2, wherein b is 2 or 3.
4. A dye according to claim 1, wherein each of x and y is 1.
5. A dye according to claim 4, wherein a is 2 and b is 3.
6. A dye according to claim 1, wherein z is zero.
7. A dye according to claim 1, wherein z is 1 and $R^5$ is methyl or ethyl.
8. A dye according to any claim 1, wherein z is 2, each $R^5$, independently, is methyl or ethyl and the $R^5$s are substituted at the 2- and 5- positions respectively of the piperazine nucleus.
9. A dye according to claim 1, wherein each of $X^1$ and $X^2$, independently, is a halogen atom or a pyridinium salt.
10. A dye according to claim 9, wherein each of $X^1$ and $X^2$, independently, is F or Cl.
11. A dye according to claim 10, wherein each of $X^1$ and $X^2$ is Cl.
12. A dye according to claim 1, wherein $D^1$ and $D^2$ are the same as one another.
13. A dye according to claim 1, wherein $D^1$ and $D^2$ are different from one another.
14. A dye according to claim 1 wherein at least one of $D^1$ and $D^2$ is a monoazo chromophore, or a metallized derivative thereof.
15. A dye according to claim 14, wherein each of $D^1$ and $D^2$, independently, is an optionally metallized monoazo chromophore of the formula (i)

$$A-N=N-E \qquad (i)$$

wherein:
- one of A and E is attached to the reactive triazinylamino group;
- A is derived from a diazotizable amine; and
- E is derived from a coupling component.

16. A dye according to claim 15, wherein
A is an optionally substituted aryl group and when A is attached to the triazinylamino group the attachment may be from the aryl group or from a substituent thereon;
E is an optionally substituted aryl or heteroaryl group and when E is attached to the triazinylamino group the attachment may be from the aryl or heteroaryl group or from a substituent thereon, or E is an acetoacetamidoaryl group wherein the aryl moiety is optionally substituted and wherein the azo linkage in the formula (i), given and defined in claim 15, is linked to the methylene group of the acetoacetamidoaryl group and when E is attached to the triazinylamino group the attachment may be from the aryl moiety or from a substituent thereon.

17. A dye according to claim 16, wherein
the group E is attached to the triazinylamino group in formula (I), A is a phenyl or naphthyl group, optionally substituted by at least one of an alkyl, halo, cyano, hydroxy, aryloxy, alkylsulphonyl or arylsulphonyl group or a carboxylic or sulphonic acid group or salt thereof; and E is an optionally substituted aryl or heteroaryl group selected from phenyl, naphthyl, pyrazolyl, pyrazolonyl, pyridyl, pyridonyl and pyrimidinyl groups or is an optionally substituted acetoacetamidoaryl group;

which said aryl or heteroaryl group or aryl moiety of the acetoacetamidoaryl group is optionally substituted by an alkyl, phenyl, naphthyl or amino- (which may bear a $C_{1-4}$ alkyl group), amido- or sulphonamido-phenyl or naphthyl group and E may be attached to the triazinylamino group from the said substituted alkyl group, phenyl or naphthyl group or phenyl or naphthyl moiety of the said substituent;

which said aryl or heteroaryl group is further optionally substituted at least so as to provide the coupling component from which the group E is derived with sufficient electron donating capacity to allow the said coupling; and when A is an α-naphthol, which dye is optionally metallized.

18. A dye according to claim 17, wherein the group E is a phenyl or naphthyl group optionally substituted by an alkyl, alkoxy, ureido, acylamido, alkylsulphonyl, halo, hydroxyl or amino group, which amino group is optionally substituted by at least one alkyl group, or a carboxylic or sulphonic acid group or a salt thereof.

19. A dye according to claim 17, wherein the group E is a pyrazolyl, pyrazolonyl, pyridyl, pyridonyl or pyrimidinyl group and is substituted by a hydroxyl, mercapto or amino group, which amino group is optionally substituted by at least one alkyl group.

20. A dye according to claim 16, wherein the group A is attached to the triazinylamino group in formula (I), A is a phenyl or naphthyl group;

which said phenyl or naphthyl group is optionally substituted by an alkyl, phenyl, naphthyl or amino- (which may bear a $C_{1-4}$ alkyl group), amido- or sulphonamido-phenyl or naphthyl group and A may be attached to the triazinylamino group from the said substituent alkyl, phenyl or naphthyl group or phenyl or naphthyl moiety of the said substituent;

which said phenyl or naphthyl group of A is additionally optionally substituted by an alkyl, alkoxy or halo group or a carboxylic acid or sulphonic acid group or a salt thereof; and E is an aryl or heteroaryl group selected from phenyl, naphthyl, pyrazolyl, pyrazolonyl, pyridyl, pyridonyl and pyrimidinyl groups or is an optionally substituted acetoacetamidoaryl group;

which said aryl or heteroaryl group is optionally substituted at least so as to provide the coupling component from which the group E is derived with sufficient electron donating capacity to allow the said coupling; and when E is an α-naphthol group, the dye is optionally metallized.

21. A dye according to claim 20, wherein the group E is a phenyl or naphthyl group optionally substituted by an alkyl, alkoxy, ureido, acylamino, alkylsulphonyl, halo, hydroxyl or amino group, which amino group is optionally substituted by at least one alkyl group, or is a carboxylic or sulphonic acid group or a salt thereof.

22. A dye according to claim 20, wherein the group E is a pyrazolyl, pyrazolonyl, pyridyl, pyridonyl or pyrimidinyl group substituted by a hydroxyl, mercapto or amino group, which amino group is optionally substituted by at least one alkyl group.

23. A dye according to claim 17, wherein

A is an optionally substituted phenyl or naphthyl group (Ar) and E is an acetoacetamidoaryl group such that at least one of $D^1$- and $D^2$- is a chromophore of the formula (iii)

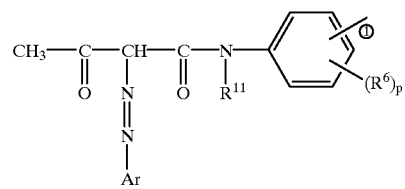

(iii)

wherein:

the or each of $R^6$ is alkyl, alkoxy, halo, $H_2NCONH$, $CH_3CONH$ or $SO_3H$ (or a salt thereof;

$R^{11}$ is hydrogen or alkyl;

p is zero or 14;

Ar is an optionally substituted phenyl or naphthyl group or is a chromophore; and the unsubstituted bond ① indicates a link to a triazinylamino group in the formula (i).

24. A dye according to claim 20 wherein:

E is an acetoacetamidoaryl group and A is an optionally substituted phenylene group such that at least one of $D^1$- and $D^2$- is a chromophore of the formula (iv)

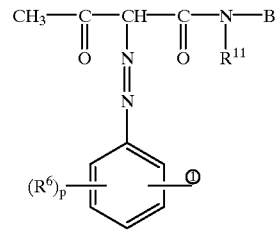

(iv)

wherein B is an optionally substituted aryl group;

the or each $R^6$ is alkyl, alkoxy, halo, $H_2NCONH$, $CH_3CONH$ or $SO_3H$ (or a salt thereof);

$R^{11}$ is hydrogen or alkyl;

p is zero or 1–4; and the unsubstituted bond ① indicates a link to a triazinylamino group in the formula (I).

25. A dye according to claim 23, wherein p is zero or is 1, 2 or 3.

26. A dye according to claim 17, wherein, in at least one of $D^1$ and $D^2$, E is an optionally substituted phenylene group and thereby provides, in the dye, at least one chromophore of the formula (v)

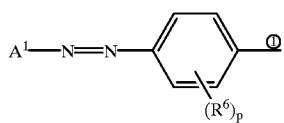
(v)

where in:
A$^1$ is a phenyl or naphthyl group, optionally substituted by at least one of an alkyl, halo, cyano, hydroxy, aryloxy, alkylsulphonyl or arylsulphonyl group or a carboxylic or sulphonic acid group (or a salt thereof);
the or each R$^6$, independently, is alkyl, alkoxy, halo, H$_2$NCONH, H$_3$CCONH or SO$_3$H (or a salt thereof);
p is zero or is 1–4; and
the unsubstituted bond ① indicates a link to a triazinylamino group in the formula (I).

27. A dye according to claim 26, wherein p is zero or p is 1, 2 or 3.
28. A dye according to claim 27, wherein p is 1 or 2.
29. A dye according to claim 27, wherein each of D$^1$- and D$^2$-, independently, is of the formula (vi)

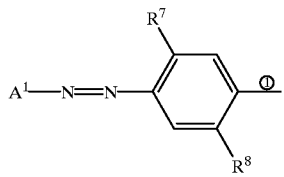
(vi)

wherein A$^1$ is a phenyl or naphthyl group, optionally substituted by at least one of an alkyl, halo, cyano, hydroxy, aryloxy, alkylsulphonyl or arylsulphonyl group or a carboxylic or sulphonic acid group (or a salt thereof);
R$^7$ is alkyl, alkoxy, halo, H$_2$NCONH or H$_3$CCONH; and
R$^8$ is H, alkyl, alkoxy or halo.

30. A dye according to claim 29, wherein R$^7$ is H$_2$NCONH— and R$^8$ is H.
31. A dye according to claim 29, wherein A$^1$ is a phenyl or naphthyl group substituted by at least one SO$_3$H group, or a salt thereof.
32. A dye according to claim 26, wherein, in the formula (I), x is zero, y is 1 and b is 2 or 3.
33. A dye of the formula (I)

34. A dye according to claim 26, wherein E is an optionally substituted heteroaryl group.
35. A dye according to claim 34, wherein E has the formula (vii)

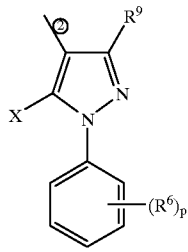
(vii)

wherein
the or each R$^6$ is alkyl, alkoxy, halo, H$_2$NCONH, CH$_3$CONH or SO$_3$H (or a salt thereof);
p is zero or 1–4;
X is OH or NH$_2$; and
R$^9$ is methyl, carboxyl or methoxycarbonyl; or

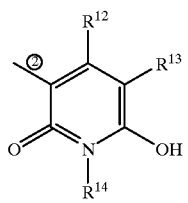
(viii)

wherein R$^{12}$ is hydrogen, C$_{1-4}$ alkyl or phenyl; R$^{13}$ is hydrogen, C$_{1-4}$ alkyl, CONH$_2$, CN or CH$_2$SO$_3$H, and R$^{14}$ is C$_{1-4}$ alkyl or phenyl; or

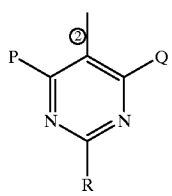
(ix)

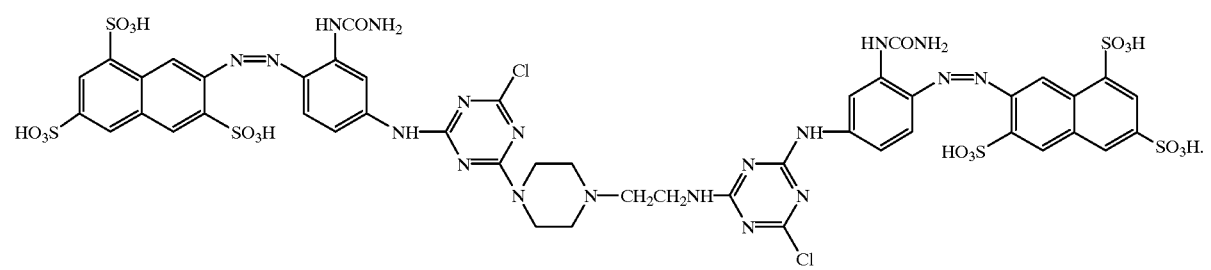
(1)

wherein each of P, Q, and R, independently, is hydrogen, $C_{1-4}$ alkoxy, hydroxyl, $C_{1-4}$ alkythio, mercapto, amino, $C_{1-4}$ alkylamino or (di-$C_{1-4}$ alkyl) amino; and wherein, in each of formula (vii)–(ix), the bond ② is attached to the monoazo group in the formula (i)

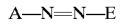 (i)

wherein:

A is derived from a diazotizable amine; and

E is derived from a coupling component.

36. A dye according to claim 17, wherein E is a heteroaryl or heteroaralkyl group.

37. A dye according to claim 36, wherein E is a heteroaryl group of the formula (x)

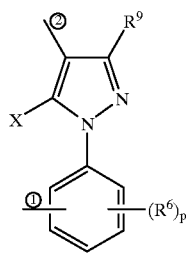 (x)

wherein the or each $R^6$ is alkyl, alkoxy, halo, $H_2NCONH$, $CH_3CONH$ or $SO_3H$ (or a salt thereof);

p is zero or 1–4;

X is OH or $NH_2$; and $R^9$ is methyl, carboxyl or methoxycarbonyl;

or E is a hetero or heteroaralkyl group of the formula

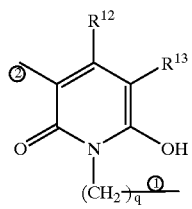 (xi)

wherein $R^{12}$ is hydrogen, $C_{1-4}$ alkyl or phenyl;

$R^{13}$ is hydrogen, $C_{1-4}$ alkyl, $CONH_2$, CN or $CH_2SO_3H$; and q is zero or is 1–4; and in each of the formula (x) and (xi), the bond ① indicates a link to a triazinylamino group in the formula (I), and the bond ② is attached to the monoazo group in the formula (i)

 (i)

wherein:

A is derived from a diazotizable amine; and

E is derived from a coupling component.

38. A dye according to claim 17, wherein E is a hydroxynaphthyl group optionally substituted by at least one sulphonic acid group or a salt thereof and optionally further substituted by a halogen atom, a hydroxyl group, a methyl group or an acylamino group.

39. A dye according to claim 38, wherein E is a hydroxynaphthyl group substituted by at least one sulphonic acid group or a salt thereof.

40. A dye according to claim 38, wherein, in the formula (I), x is zero, y is 1 and b is 2 or 3.

41. A dye according to claim 38, wherein the group E has the formula (xiii)

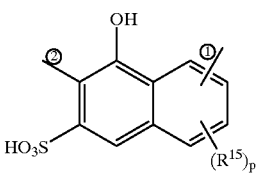 (xiii)

or has the formula (xiv)

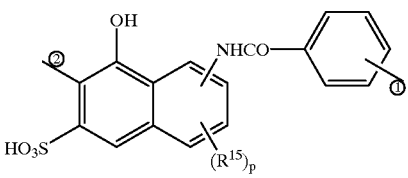 (xiv)

wherein in each formula (xiii) and (xiv) the or each $R^{15}$ is halogen, methyl, acylamino or $SO_3H$ or a salt thereof and p is zero or 1–4;

the bond ① indicates a link to a triazinylamino group in the formula (I); and the bond ② is attached to the monoazo group in the formula (i)

 (i)

wherein:

A is derived from a diazotizable amine; and

E is derived from a coupling component.

42. A dye of the formula (2)
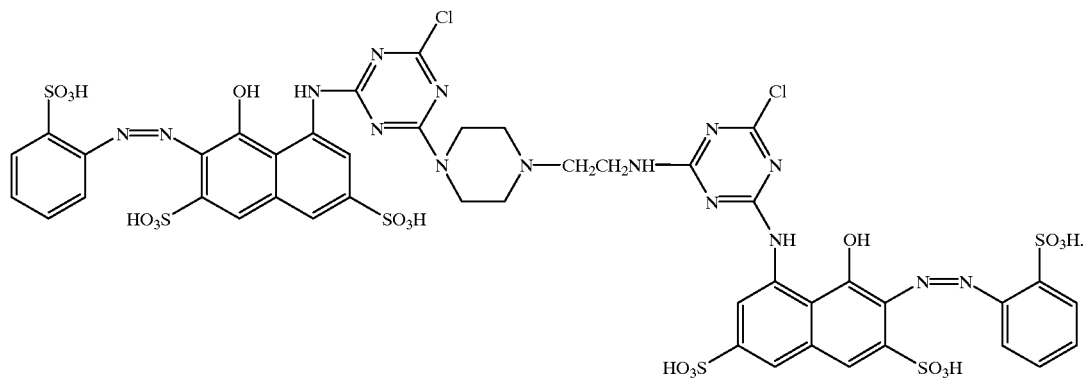
43. A dye of the formula (3)
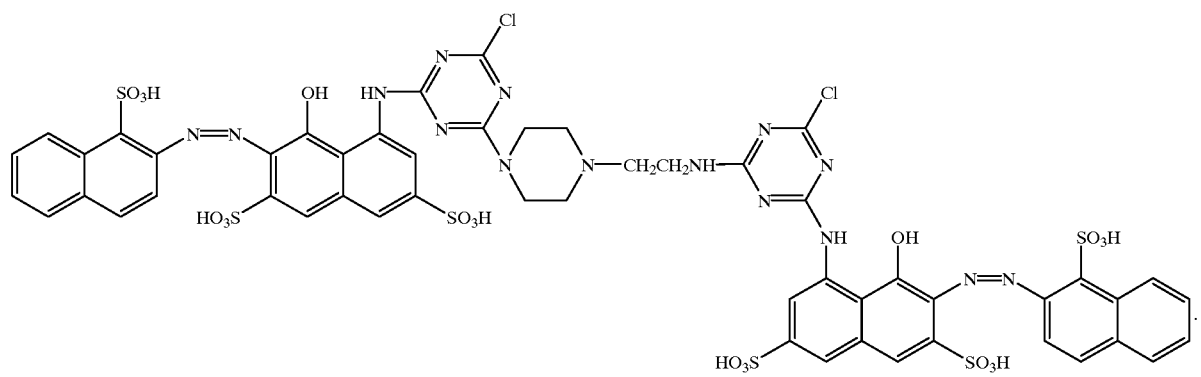
44. A dye of the formula (4)
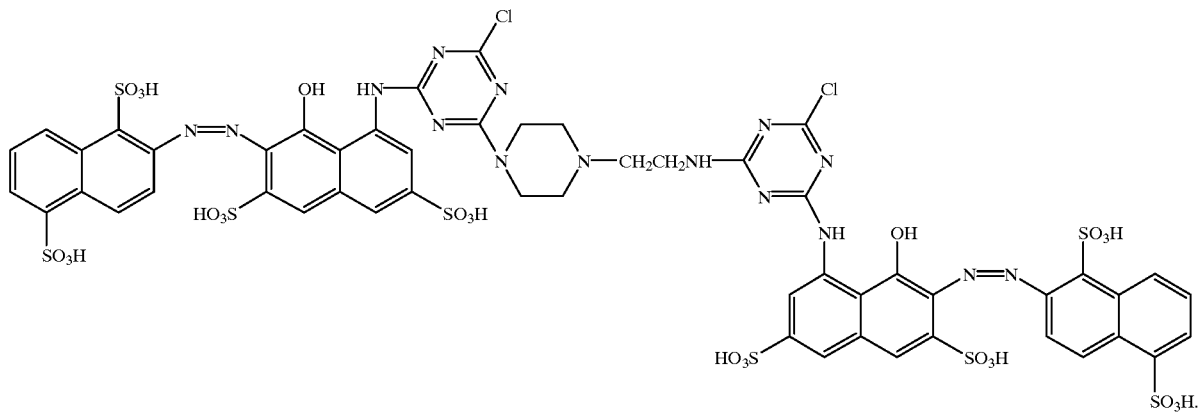

45. A dye according to claim 15, wherein each of $D^1$- and $D^2$-, independently, is a coppered monoazo chromophore of the formula (xv)

(xv)

wherein $X^1$ is a sulphonic acid group (or a salt thereof), a carboxyl group (or a salt thereof), or an alkyl or alkoxy group or a halogen atom;

$X^2$ is a sulphonic acid group;

$B^1$ is an optionally substituted phenylene or naphthalene group linked to the naphthalene nucleus either directly or through an optional substituent and linked to the triazinylamino group either directly or through an optional substituent;

s is zero or is 1–4;

t is zero or is 1–3;

u is zero or 1; and the unsubstituted bond ① indicates a link to a triazinylamino group in the formula (I).

46. A dye according to claim 45, wherein the coppered monoazo chromophore has the formula (xvi)

(xvi)

where $X^1$ and s are as defined in claim 45.

47. A dye according to claim 1, wherein at least one of $D^1$ and $D^2$ is a disazo chromophore, or a metallized derivative thereof.

48. A dye according to claim 47, wherein each of $D^1$ and $D^2$, independently, is a disazo chromophore of the formula (xvi)

$$A^2-N=N-M-N=N-A^3 \qquad \text{(xvi)}$$

wherein one of $A^2$ and $A^3$ is attached to the triazinylamino group and each of $A^2$ and $A^3$, independently, is a phenyl or naphthyl group, optionally substituted by at least one group, independently, selected from sulphonic acid (or a salt thereof, carboxylic acid (or a salt thereof, alkyl, alkoxy, acylamino, halo, alkylsulphonyl and alkylsulphonylamino groups; and M is a naphthylylene group substituted by at least a hydroxyl and an amino group and optionally substituted by at least one sulphonic acid group.

49. A dye according to claim 48, wherein M is a group of the formula (xviii)

(xviii)

wherein the sulphonic acid group in the 8-amino-substituted ring is in the 5- or 6- position.

50. A dye according to claim 48, wherein each of $D^1$ and $D^2$, independently, is a disazo chromophore of the formula (xix)

$$A^2-N=N-M^1-N=N-E^2 \qquad \text{(xix)}$$

wherein one of $A^2$, $M^1$ and $E^2$ is attached to the triazinylamino group;

$A^2$ is as defined in claim 48;

$M^1$ is 1,4-phenylene or 1,4-naphthalene group, optionally substituted by at least one group selected from and alkyl, alkoxy, halo and arylamino group and a sulphonic acid group and a salt thereof; and $E^1$ is a 1,4-phenylene or 1,4-naphthalene group, optionally substituted by at least one group selected from an alkyl, alkoxy, halo and an arylamino group and a sulphonic acid group and a salt thereof.

51. A dye according to claim 50, wherein each of $M^1$ and $E^2$, independently, is a group of the formula (xx)

(xx)

wherein the or each $X^3$, independently, is alkyl, alkoxy, acetylamino or alkylsulphonylamino or sulphonic acid group or salt thereof, and p is zero or 1–4; or a group of the formula (xxi)

(xxi)

wherein the or each $X^4$, independently, is alkyl, alkoxy, halo, sulphonic acid (or a salt thereof) or carboxyl (or a salt thereof) and r is zero or 1–4.

52. A dye according to claim 47, wherein each of $D^1$- and $D^2$-, independently, is a coppered disazo chromophore of the formula (xxii)

(xxii)

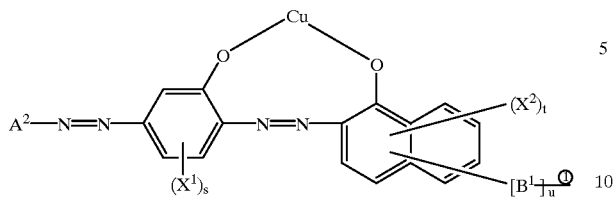

wherein A² is a phenyl or naphthyl group, optionally substituted by at least one group, independently. selected from sulphonic acid (or a salt thereof), carboxylic acid (or a salt thereof), alkyl, alkoxy, acylamino, halo, alkylsulphonyl and alkylsulphonylamino groups;

X¹ is a sulphonic acid group (or a salt thereof), a carboxyl group (or a salt thereof), or an alkyl or alkoxy group or a halogen atom;

X² is a sulphonic acid group;

B¹ is an optionally substituted phenylene or naphthalene group linked to the naphthalene nucleus either directly or through an optional substituent and linked to the triazinylamino group either directly or through an optional substituent;

s is zero or is 1–4;

t is zero or is 1–3; and u is zero or 1.

53. A dye according to claim 52, wherein the coppered disazo chromophore has the formula (xxiii)

(xxiii)

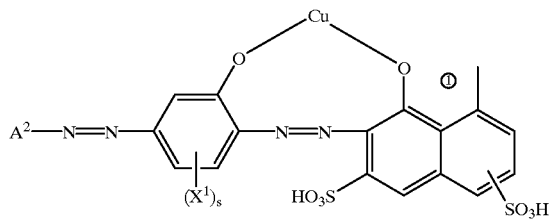

wherein A² is a phenyl or naphthyl group, optionally substituted by at least one group, independently, selected from sulphonic acid (or a salt thereof), carboxylic acid (or a salt thereof), alkyl, alkoxy, acylamino, halo, alkylsulphonyl and alkylsulphonylamino groups;

X¹ is a sulphonic acid group (or a salt thereof), a carboxyl group (or a salt thereof), or an alkyl or alkoxy group or a halogen atom;

and s is 1 or 2.

54. A process for preparing a dye of the formula (I), given and defined in claim 1, which process comprises reacting a piperazine of the formula (II)

(II)

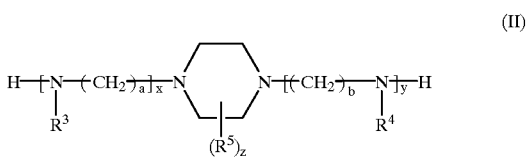

wherein each of R³, R⁴, R⁵, x, y, a, b and z is as defined in claim 1, with an equimolar proportion of each of two reactive dyes respectively of the formulae (III)

(III)

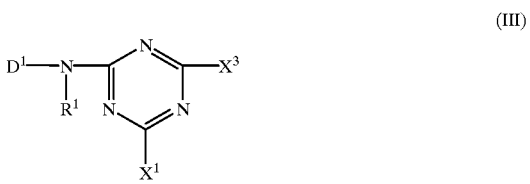

wherein each of D¹, R¹ and X¹ are as defined in claim 1 and X³ is a labile atom or group capable of reaction with an amine, and (IV)

(IV)

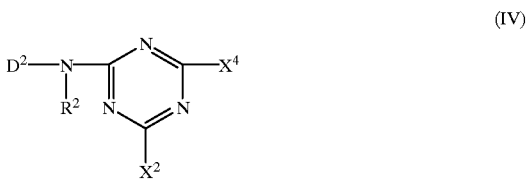

wherein each of D², R² and X² is as defined in claim 1 and X⁴ is a labile atom or group capable of reaction with an amine, or, when each of D¹, R¹, X¹ and X² is the same as D², R², X² and X⁴ respectively, with two moles of a reactive dye of the formula (III) or (IV) per mole of the piperazine of the formula (II), to obtain the dye of the formula (1).

55. A process for the colouration of a substrate, which process comprises applying to the substrate, at a pH above 7, a dye according to claim 1.

56. A process according to claim 55, wherein the dye is applied to the substrate by exhaust dyeing, padding or printing.

* * * * *